April 19, 1927.
B. C. SEATON
1,625,284
MOLD AND METHOD FOR CONSTRUCTING CONTINUOUS TUBES
Filed Oct. 9, 1924
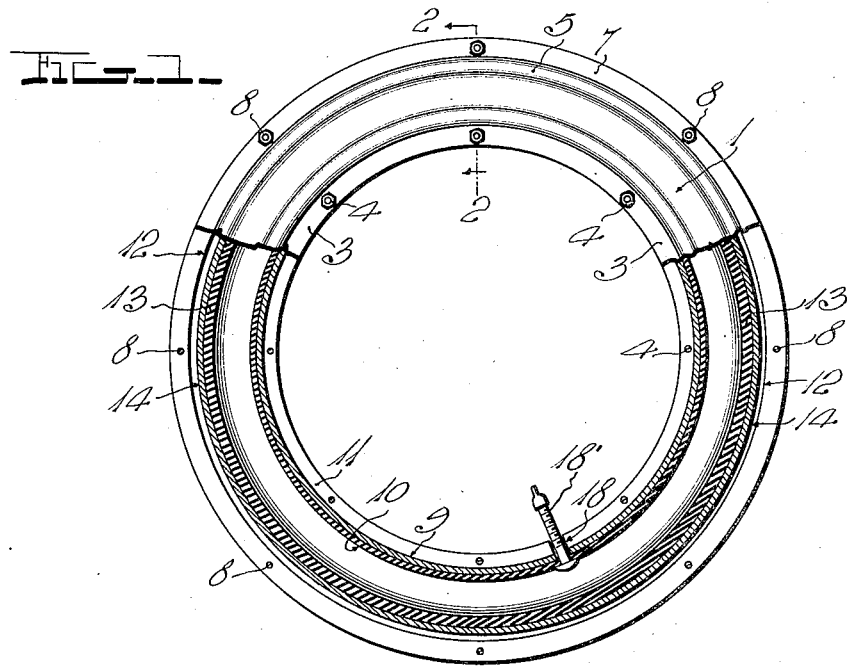
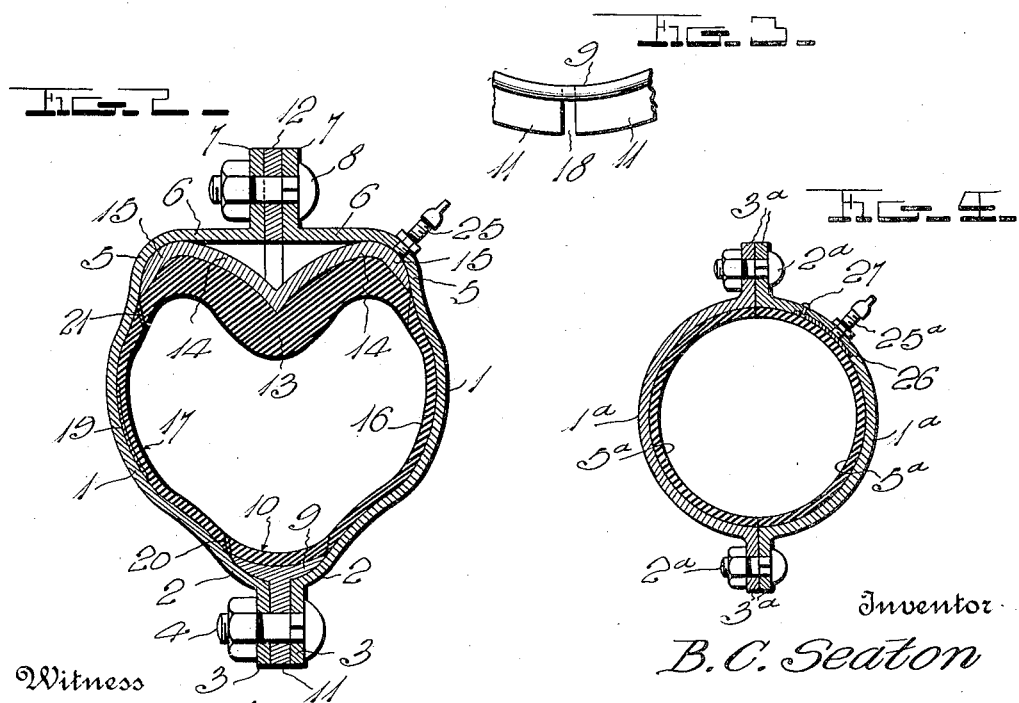
Witness
H. Woodard
Inventor
B. C. Seaton
By H. B. Wilson & Co.
Attorneys Patented Apr. 19, 1927.

1,625,284

UNITED STATES PATENT OFFICE.

BENJAMIN C. SEATON, OF NASHVILLE, TENNESSEE.

MOLD AND METHOD FOR CONSTRUCTING CONTINUOUS TUBES.

Application filed October 9, 1924. Serial No. 742,680.

This application relates to an improved mold and method for use in constructing continuous inflatable tubes, such as the inner tubes of pneumatic tires and the so-called "air bags" which are employed in the construction of tire casings, and it may here be stated that the present application forms a continuation in part of my allowed U. S. application, Serial No. 659,809, allowed August 26th, 1924.

As in the application just referred to, a number of the objects of the invention are to provide a mold which is so constructed that a tube of the type shown in my U. S. Patent No. 1,374,957, of April 19, 1921, may be formed in an efficient manner and with a minimum amount of labor; to provide a mold formed in sections releasably held in a set-up position and each having a portion of the tube applied to its inner surface in such a manner that the edge portions of the tube-forming sections will adhere and form a one-piece circular tube upon vulcanization; to provide a mold which is so constructed that when assembled with the tube-forming elements in place, a valve may have its barrel portion extending to the exterior of the mold so that air may be admitted to hold the green rubber in proper position against the wall of the mold; to provide a mold in which the elements forming the same may well be formed of sheet metal rolled or otherwise formed into the proper shapes, thus providing a mold which will be very inexpensive; and to provide an improved method of forming a tube, whereby said tube may be formed of strips of green rubber assembled in sections of a mold to form a circular tube, and cured in the same mold in which they are assembled.

A further object of the invention is to provide for the admission of fluid under pressure between the interior of the mold and the tube, after the vulcanizing operation is complete, thus effectively loosening said tube from the mold and permitting it to be easily removed when the mold sections are disconnected from each other.

With the foregoing in view, the invention resides in the novel subject matter hereinafter described and claimed, the description being supplemented by the accompanying drawings.

Figure 1 is a side elevation partly in section, showing the mold and a tube therein.

Figure 2 is a transverse sectional view taken on line 2—2 of Fig. 1.

Figure 3 is a fragmentary side elevation showing a portion of the mold and disclosing the passage through which the barrel of the tube inflating valve will extend.

Figure 4 is a view similar to Fig. 2 but illustrating a different form of mold for carrying out my improved method of tube construction, when manufacturing tubes of the ordinary type, instead of the special type disclosed in the patent above referred to.

The form of mold structure disclosed in Figs. 1 to 3, has been especially designed for use in forming an inner tube having the construction shown in my prior Patent No. 1,374,957, issued April 19th, 1921, and in the illustration, the mold has been shown with the proper shape to form an inner tube of the specific construction disclosed in the prior patent. It will be understood however, that the mold may be used for forming inner tubes having a different specific construction from that disclosed in my prior patent and that when made for use in forming inner tubes of another specific construction from that shown, the sections forming the mold will be formed in the appropriate shape.

In Figs. 1 to 3, the main mold or casing-forming sections 1 are of duplicate construction and will each be formed as a circular trough-shaped plate which will be shaped in cross section as shown in Fig. 2 to provide an inner tube having its side wall portions shaped as shown in the prior patent and as disclosed in Fig. 2 of the accompanying drawing. The inner peripheral portion of each section 1 is dished as shown at 2 and terminates in a flange portion 3 having openings formed therein to receive fastener bolts 4. The outer peripheral portion is dished to provide an outwardly curved shoulder 5 from which extends an annular wall portion 6 terminating in outstanding flanges 7 which are also perforated to receive fastener bolts 8. It will thus be seen that by means of the bolts 4 and 8, the sections of the mold can be securely but releasably held in the assembled condition.

The ring 9 against which the strip of green rubber 10 to form the rim portion of the tire is placed, is crescent-shaped in cross section and will have contact with the dished portion 2 of the main mold sections 1. A web 11 extends outwardly from this ring 9 and fits between the flanges 3 and will be provided with openings so that the bolts 4 may pass through the registering openings in the flanges 3 and 11 and securely hold the ring 9 in place. By having the outer face of this ring 9 in engagement with the dished portions 2 of the main mold forming sections 1, a good fit will be provided and further the ring 9 will serve to brace the outer peripheral portions of the two sections 1. A ring 12 which corresponds in thickness to the flange 11 has been provided between the flanges 7 of the sections 1, so that when the device is asembled, the inner and outer peripheral portions of the two sections 1 will be secured in the same spaced relation.

In order to carry the tread-forming portion 13 of the inner tube, there has been provided a metal ring 14 which will be shaped in cross section to conform to the cross-sectional shape of the tread-forming strip 13 and has its edge portions 15 curved as shown in Fig. 2 for engagement with the shoulder portions 5 of the mold-forming sections 1. It will thus be seen that this mold will be formed of four sections which carry the tube-forming rubber strips or rings 10, 13, 16 and 17 and that these sections which form the mold can be easily and quickly put together or taken apart and securely held in the proper relation to each other to form the assembled mold.

When this mold is in use, one main section 1 of the mold is placed upon a suitable support and the circular strip 16 of raw rubber will be put in place. The ring 9 which carries the strip or ring 10 of green rubber may then be put in place with the beveled lower edge of this rubber strip 10 resting upon the beveled edge at one side of the strip 16. The valve 18' can then be put in place with its barrel extending through the passage 18 formed in the rings 9 and flange or web 11. The ring 14 which carries the thick strip 13 for forming the tread portion of the tube will then be put in place and its lower curved portion 15 will rest upon the shoulder portion 5 of the lower mold section 1. The beveled lower edge of the tread-forming rubber strip or ring 13 will engage with the beveled side edge of the wall-forming strip 16. It will thus be seen that the side edge portions of the strip 16 and the lower edge portions of the strips 10 and 13 will have overlapping engagement. After the rings 9 and 14 have been put in place, the ring 12 will be put in place upon the flange 7 of the lower mold section 1 so that when the upper mold section 1 is put in place, it will be properly supported. Before the upper mold section 1 is put in place, the wall-forming strip or ring 17 of green rubber will be placed in said upper section 1 and may be prevented from dropping out of this section when the section is in an inverted position, by a very thin strip of viscous gum 19 placed in the upper mold section. Similar strips 20 and 21 which are also formed of very thin gum are placed upon the beveled edges of the tube-forming strip 17 and may slightly overlap the upper edge portions of the rings 9 and 14. It is preferable to provide these strips 19, 20 and 21 as the strip 17 has to be placed in the mold section 1 and the mold section then turned to an inverted position so that it can be put in place. The strip 19 holds the strip 17 in place and when the beveled edges of the strip 17 engage the gummed strips 20 and 21, the edge portions of the strip 17 will adhere firmly to the edges of the strips 10 and 13. It should be further noted that the weight will cause air-tight connection between the edge portions of the strip 16 and strips or rings 10 and 13 and that the strips 20 and 21 will serve not only to provide air-tight joints between the strip 17 and the strips 10 and 13 but will further provide thin gaskets between the mold sections 1 and the rings 9 and 14 and prevent any possibility of air escaping at these points. After the mold has been assembled and the fastener bolts 4 and 8 put in place and tightened, this mold can be placed in the usual vulcanizing machine and the tube baked the necessary length of time. The heat will cause the rings 10, 13, 16 and 17 to merge into each other and form a unitary structure thus forming a tube which will be circular in shape. The heat will thoroughly melt the strips 19, 20 and 21 and they will be absorbed by the tube-forming strips or rings 10, 13 and 17 and a tube will be provided which will have a smooth surface. The inner tube may thus be molded in a very efficient manner as a circle and the valve vulcanized into the tube at the same time the tube is formed.

For the purpose of effectively loosening the vulcanized tube from the mold, I have provided an air inlet 25 which may well be in the form of an ordinary tire inflation valve, opening through one of the annular wall portions 6. The green rubber is prevented from entering the inner end of the air inlet or valve 25, by one of the edge portions 15 of the ring 14, as will be clear from Fig. 2. After the tube has been vulcanized, the valve through which fluid pressure was supplied to said tube, is opened, so that such pressure can escape. Then, air or other fluid under pressure is admitted into the mold, through the inlet or valve 25. This air quickly finds its way between the tube and the parts of the mold with which said tube contacts, so as to effectively loosen said tube from the mold, permitting it to be easily removed when the mold sections are disconnected from each other.

Fig. 4 discloses a mold for carrying out my invention in the production of an ordinary continuous tube, instead of the special type of tube shown in Figs. 1 and 2. In this figure, two complementary mold sections 1ª are shown, whose inner and outer peripheral edges may be secured in contact with each other by any preferred means, such as the bolts 2ª passing through projecting flanges 3ª on the mold sections. In forming a tube with this type of mold, rings 5ª of green rubber are applied to the inner sides of the mold sections 1ª before said sections are connected with each other. Then, when the mold sections are secured together, the continuous edges of one of the green rubber rings 5ª, will abut the corresponding edges of the other ring, and when the green rubber tube, formed by the two rings is inflated, the rubber is compressed against the walls of the mold, so that the edges of each ring are forced into tight contact with the edges of the other ring. Upon the vulcanizing process, these edges will be integrally joined, forming a one-piece, continuous tube, and it will be seen that such tube may be manufactured more easily and at less cost than required by the usual methods of tube construction.

At 25ª in Fig. 4, a valve or air inlet is shown, having the same function as the inlet or valve 25. Suitable means is employed to prevent the green rubber from blowing outwardly into this inlet or valve, and for performing this function, I have illustrated a spring metal plate 26 which extends over the inner end of the inlet or valve. This plate may be connected with the mold in any suitable manner to prevent the outward blowing of the green rubber, but to permit air to enter through the inlet 25ª, when desired. I have shown a fastener 27ª connecting one end of the plate 26 with the mold, the other end of said plate however being free so that it may yield outwardly to admit the air. This air is only admitted when the completely vulcanized tube is to be loosened from the walls of the mold, as will be readily understood.

It will be seen from the foregoing that I have provided an improved method for the construction of continuous pneumatic tubes, and that I have also provided novel mold structures for carrying out such method. While excellent results may be obtained from the details disclosed and they are therefore preferably followed, it is to be understood that within the scope of the invention as claimed, numerous modifications may be made.

I claim:

1. A pneumatic tube mold comprising a pair of annular side sections to form the side walls of the tube, a ring associated with the inner sides of said sections at the inner peripheral portions thereof and adapted to form the rim portion of the tube, a relatively wide ring engaging the inner sides of said sections at the outer peripheries thereof and adapted to form the tread portion of the tube, said tread-forming ring being inwardly bowed throughout its circumference, and means for securing said annular mold sections and said rings in assembled relation.

2. A tube mold comprising circular main sections having intermediate portions for carrying circular green rubber strips to form side walls of a tube, the outer peripheral portions of said mold sections being provided with annular shoulder portions and laterally extending flanges, a ring at the inner peripheral portions of said mold sections adapted to carry a green rubber strip to form the inner peripheral portion of the tube, a relatively wide ring engaging said shoulder portions of said mold sections, the intermediate part of said relatively wide ring being inwardly bowed throughout its circumference, and the side edges of this ring being curved inwardly to abut said shoulder portions, said relatively wide ring being adapted to carry a green rubber strip to form the outer peripheral portion of the tube, and bolts passing through the aforesaid flanges to secure said mold sections together.

3. A tube mold comprising circular main mold-forming sections having intermediate portions for carrying circular strips for forming side walls of a tube, the inner and outer peripheral portions of said sections being provided with annular shoulder portions and fastener receiving flanges, a spacing ring between the outer flanges, a ring for carrying a strip for forming the inner peripheral portion of a tube positioned in said mold and engaging the inner annular shoulders and having an outstanding web secured between the inner flanges, and a ring for carrying a strip for forming the outer peripheral portion of a tube positioned in said mold and engaging the outer annular shoulders.

4. A pneumatic tube mold comprising a pair of annular sections adapted to carry green rubber rings to form the side walls of a tube, a ring associated with the inner peripheral portions of said mold sections, adapted to carry a strip of green rubber to form the inner peripheral side of the tube, a second ring within the outer peripheral portions of said mold sections adapted to carry a strip of green rubber to form the outer peripheral portion of the tube, said second ring having its periphery bowed inwardly throughout its circumference and having its side edges curved inwardly, and means for securing said mold sections and rings in assembled relation.

5. The method of building up and vulcanizing a tube, consisting in assembling separate green rubber side walls and green rubber inner and outer rings against the inner surfaces of corresponding mold sections, with the edges of said green rubber walls and rings in contact, securing the mold sections together, injecting fluid pressure into the tube formed by said walls and rings, and heating the mold and contents to vulcanize the latter.

6. A method of building up and vulcanizing a circular tube in a single mold consisting in placing green rubber on the upper face of the lower side section of the mold, placing green rubber on the inner faces of outer and inner peripheral sections of the mold, assembling the last named sections on the lower side section with edges of the green rubber portions in contact, placing a gum strip on the uppermost edges of the outer and inner green rubber peripheral portions and upon the underface of the upper side section of the mold, securing green rubber by means of the gum strips to the underface of said upper side section of the mold, then placing the last named section in position with the edges of its green rubber contacting with the gum strips on the edges of the outer and inner peripheral portions, fastening the mold sections in assembled position, providing pressure within the mold, and subjecting the latter to heat to cure the tube.

7. The method of building up and curing an inflatable tube, consisting in placing separate green rubber side walls and green rubber inner and outer rings against the inner surfaces of corresponding mold sections, assembling the mold sections and the contained green rubber and bringing the edges of the aforesaid walls and rings into tight contact with each other, securing the mold sections together, and vulcanizing the contents of the mold while in the latter, in the presence of internal pressure.

In testimony whereof I have hereunto affixed my signature.

BENJAMIN C. SEATON.